United States Patent [19]

Astle

[11] Patent Number: 5,732,205
[45] Date of Patent: Mar. 24, 1998

[54] COLOR CONVERSION USING 4.5 BIT PALETTE

[75] Inventor: Brian Astle, Phoenix, Ariz.

[73] Assignee: Intel Corporation, Santa Clara, Calif.

[21] Appl. No.: 697,849

[22] Filed: Aug. 30, 1996

Related U.S. Application Data

[63] Continuation of Ser. No. 367,456, Dec. 30, 1994.

[51] Int. Cl.[6] .................................................. G06F 15/00
[52] U.S. Cl. .......................................................... 395/131
[58] Field of Search ........................... 395/131; 345/150, 345/199; 358/12, 13, 22, 518

[56] References Cited

U.S. PATENT DOCUMENTS

| | | | |
|---|---|---|---|
| 4,743,959 | 5/1988 | Frederiksen | 358/11 |
| 4,775,858 | 10/1988 | Stapleton et al. | 340/724 |
| 4,857,992 | 8/1989 | Richards | 358/13 |
| 4,991,122 | 2/1991 | Sanders | 364/521 |
| 5,068,644 | 11/1991 | Batson et al. | 340/701 |
| 5,124,688 | 6/1992 | Rumball | 340/703 |
| 5,138,303 | 8/1992 | Rupel | 340/703 |
| 5,142,273 | 8/1992 | Wobermin | 340/703 |
| 5,204,664 | 4/1993 | Hamakawa | 340/703 |
| 5,218,431 | 6/1993 | Gleicher et al. | 358/13 |
| 5,218,432 | 6/1993 | Wakeland | 358/22 |
| 5,220,410 | 6/1993 | Wakeland et al. | 358/13 |
| 5,233,684 | 8/1993 | Ulichey | 395/131 |
| 5,258,826 | 11/1993 | Wakeland et al. | 358/12 |
| 5,329,292 | 7/1994 | Nishioka et al. | 345/199 |
| 5,341,442 | 8/1994 | Barrett | 382/56 |
| 5,381,180 | 1/1995 | Keith | 348/396 |
| 5,384,582 | 1/1995 | Keith et al. | 345/199 |
| 5,406,310 | 4/1995 | Aschenbrenner et al. | 345/150 |
| 5,416,614 | 5/1995 | Crawford | 358/530 |
| 5,428,465 | 6/1995 | Kanamori et al. | 358/518 |
| 5,428,720 | 6/1995 | Adams, Jr. | 395/131 |
| 5,430,465 | 7/1995 | Sabella et al. | 345/199 |
| 5,450,098 | 9/1995 | Oz | 345/145 |
| 5,485,558 | 1/1996 | Weise et al. | 395/131 |

OTHER PUBLICATIONS

IBM Technical Disclosure Bulletin, vol. 37, No. 03, Mar. 1994 New York, US, pp. 95–96, XP 000107434 'Direct–to–Palette Dithering.'

IBM Technical Dislosure Bulletin, vol. 33, No. 5, Oct. 1990 New York, US, pp. 200–205, XP 000107434 'Default RGB color Palette with Simple Conversion from YUV.'

IEEE Transactions on Consumer Electronics, vol. 37, Issue 3, Aug. 1991, pp. 182–189, "Single–Chip Video Processing System,"by Hans–Jürgen Désor.

*Primary Examiner*—Phu K. Nguyen
*Attorney, Agent, or Firm*—William M. Murray; N. Stephen Kinsella

[57] ABSTRACT

A computer-implemented process and apparatus are used for efficient conversion of color video signals. The most significant bits (MSBs) of YUV data are masked off and converted into a single index that allows for the number of colors needed in a standard display format. The Y MSBs are scaled down by a fractional factor prior to the formation of the index so as to save computer memory space that would otherwise be wasted. In a preferred embodiment, relatively low-noise and temporally-changing dithering is applied to the values of full-sampled YUV data prior to color conversion.

44 Claims, 5 Drawing Sheets

COLOR CONVERSION USING 4.5 BIT PALETTE

This application is a continuation of copending application Ser. No. 08/367,456 filed on Dec. 30, 1994, which designated the U.S.

BACKGROUND OF THE INVENTION

1. Field of the Invention

The present invention relates to signal processing, and, in particular, to computer-implemented methods and apparatus for encoding and decoding color video signals.

2. Description of the Related Art

This invention relates to color video transmissions between two or more nodes, wherein each node is a computer system communicating with other nodes over a selected transmission medium. Because transmission media typically have finite bandwidths, in order to provide color video transmissions of satisfactory quality, each computer system preferably compresses in real time the video signals corresponding to the local participant and transmits the resulting compressed signals to the systems of the remote participants. Each system also preferably receives and decompresses compressed signals from the systems of the remote participants to display the decompressed video signals locally.

What are needed are color video encoding and decoding methods than can be implemented in real time on computer systems to generate compressed video signals that can be transmitted under practical bandwidth constraints and then be decompressed in real time by the receiving systems to provide satisfactory video transmissions.

It is accordingly an object of this invention to overcome the disadvantages and drawbacks of the known art and to provide improved computer-implemented methods and apparatus systems for color conversion of compressed and decompressed video signals to provide satisfactory color video transmissions between computer systems communicating via limited-bandwidth connections.

Further objects and advantages of this invention will become apparent from the detailed description of preferred embodiments which follow.

SUMMARY OF THE INVENTION

The present invention comprises a computer-implemented process and apparatus for efficient conversion of color video signals. The most significant bits (MSBs) of YUV data are masked off and converted into a single index that allows for the number of colors needed in a standard display format such as VGA. The Y MSBs are scaled down by a fractional factor prior to the formation of the index so as to save computer memory space that would otherwise be wasted. In a preferred embodiment, relatively low-noise temporally-changing dithering is applied to the Y values of full-sampled YUV data prior to color conversion.

DETAILED DESCRIPTION

Figure 1:
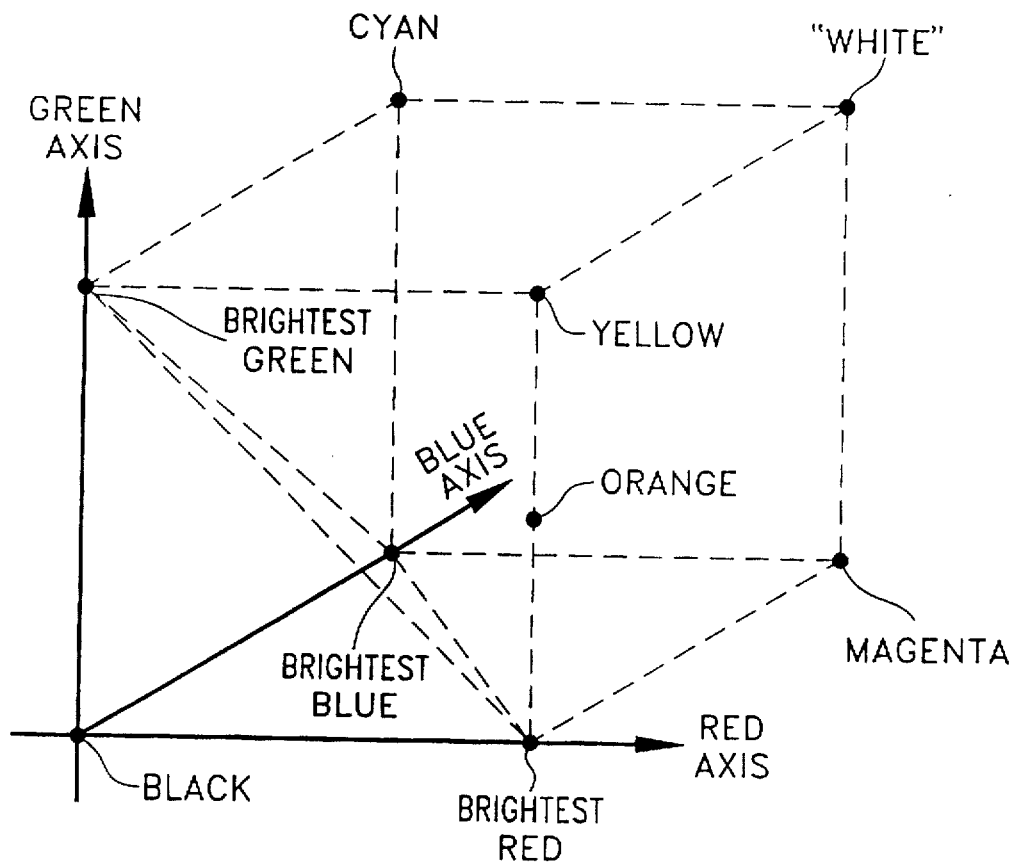
FIG. 1 depicts an RGB color cube.
Figure 2:
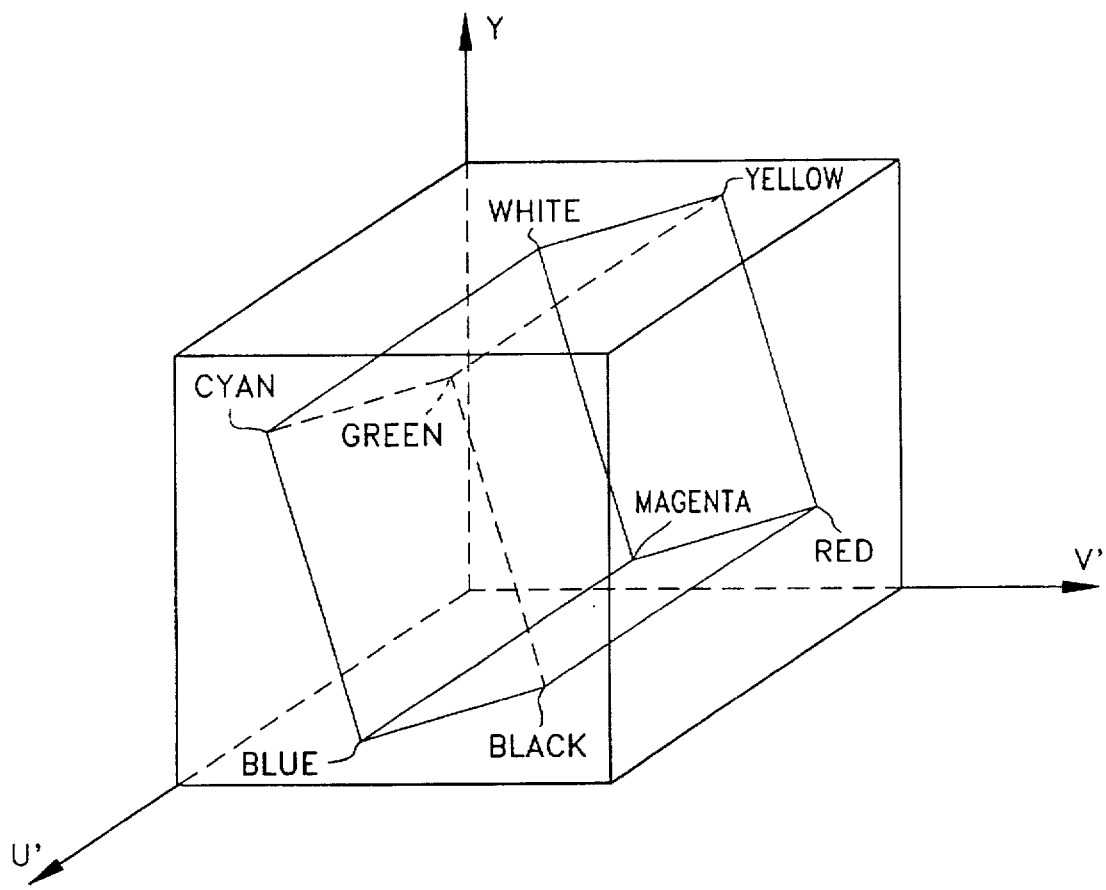
FIG. 2 shows an RGB color cube on end contained within a YUV color cube.

Referring now to FIG. 1, therein depicted is a Red-Green-Blue (RGB) color cube. The various nodes depicted show the resulting colors that occur when the system's colors are mixed. If the values of Red, Green, and Blue are each represented by an 8-bit binary word, then there will be $2^8=256$ different levels of each of these colors ranging from zero (black) to 255 (brightest Red, brightest Green, and brightest Blue respectively), thus allowing for a total of (255×255×255) different colors to be represented! A useful technique is to turn this cube up so that it stands on a "U-V plane" on the "black" corner with the "white" corner pointing vertically up from the "U-V plane" with the vertical axis extending upward between the "black" and "white" corners and being situated in the middle of a larger "YUV" cube as depicted in FIG. 2. In this manner, a linear transformation can be made between the points in the RGB cube and the corresponding points in the YUV cube. Using this approach, the "Y" values represent "luminance" (i.e. degree of brightness, from black (no color) to "white" (all colors). The "U" and "V" values then represent the "chroma" (i.e. hue) of the colors. It is to be noted that this conversion is "inefficient," in that the RGB cube fills only about 20% of the volume of the YUV cube. The values of Y, U, and V outside the RGB cube do not represent any actual color that can be reproduced by the system.

Figure 3:
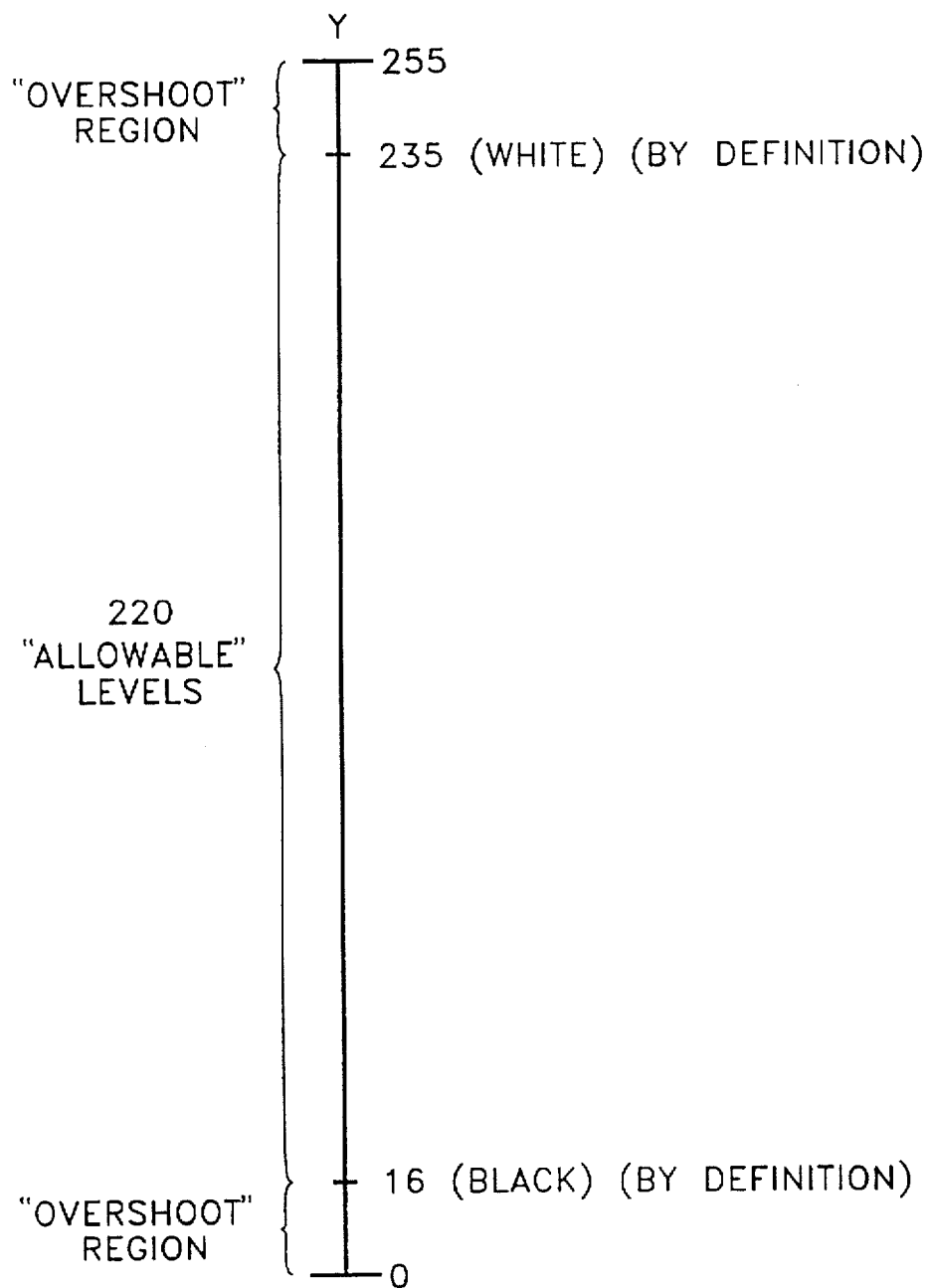
FIG. 3 shows a typical scale of the allowed values of luminance.

If Y, U, and V are each represented by separate 8-bit binary numbers, then we see that much of the YUV "space" is wasted (i.e. not used). If we truncate each of these 8-bit words down to only the three most significant bits, then there would result a YUV three-dimensional grid having only 8 Y levels (equally-spaced to include 0 at the low end and 224 at the high end), 8 U levels (also similarly equally-spaced), and 8 V levels (also similarly equally-spaced). These would include a total of 512 possible coordinates (i.e. "points") within the YUV cube, but only about 100 of these points would lie within the RGB cube. So this would allow only for about a 100-color "palette" which is much less than is needed for a standard "VGA" 256 color system. Another possibility would be to not truncate the Y word as much as we truncate the U and V values. So, for example, using the four most significant bits (MSBs) of Y, and the three MSBs of U and V respectively, would allow for 16 levels of brightness and 8 levels of U and 8 levels of V for a total of 1024 "points". Only about 20% of these lie within the RGB cube, yielding only about 200 colors which is still too few for a standard VGA system. In the alternative, using the 5 MSBs of Y and the 3 MSBs of U and the 3 MSBs of V results in 2048 "points", with about 400 of them lying within the RGB cube. This is too many for the standard VGA system. Furthermore, the full scale for Y is not used for normal colors. In particular, as is shown in FIG. 3, the "standard" Y values used range between 16 and 235 for a total of 220 possible values, in order to provide for the possibility of "overshoot" in both the bright and dark directions. So even allowing for Y overshoot, the $Y_5 U_3 V_3$ arrangement provides for about 330 different colors, which is too many! What we are seeking is an arrangement that allows for a 240 color video palette (with 16 additional "standard" colors being "reserved" for graphics purposes). So what we need is something in between the $Y_5 U_3 V_3$ and $Y_4 U_3 V_3$ arrangements.

Applicant has discovered a simple but elegant technique for "splitting the difference" and using only as much space in the hardware memory as is actually needed in order to accomplish the goal of a 240 color palette. An 11-bit word is used to represent the $Y_5 U_3 V_3$ data. Using well-known masking or truncating techniques, the 24-bit YUV data is converted to an 11-bit word with the following format:

$$[(Y_7 Y_6 Y_5 Y_4 Y_3)(U_7 U_6 U_5)(V_7 V_6 V_5)].$$

Since this arrangement provides for 330 colors, when only 240 are needed, the used "Y-space" can be restricted by using an encoding scheme that uses only the bottom 75% of the available y-space. For example, for an 11-bit word, then are $2^{11}=2048$ possible values; but if all Y values are first multiplied by ¾ prior to being encoded [i.e. $Y^*=Y-(¼)Y=(¾)Y$], then only 1600 possible points can be encoded (i.e. 0–1599) where only 242 of these correspond to colors within the RGB cube. These 242 distinct colors can be mapped via a color look up table (CLUT) into a palette of 240 desired VGA colors as needed in a VGA display. The additional two colors can just be mapped as duplicates of two of the others as determined by the system designer. The remaining hardware memory space normally reserved for the points 1600–2047 can be used for some other purpose, such as storing microcode.

So, for example, consider the original Y, U, V values of Y=100, U=100, V=100. These would first be modified by scaling the Y valued down to $Y^*=75$. So, in 8-bit binary words the $Y^*UV$ value becomes:

$$(Y^*)(U)(V)=(01001011)(01100100)(01100100).$$

The next step is to "mask off" (i.e. truncate) and combine these into a $W=Y^*_5 U_3 V_3$ 11-bit index format (using the five most significant digits of $Y^*$, and the three most significant digits, respectively, of U and V). So, in this example, $$W=01001011011.$$

It should be noted that this 11-bit word W allows for finer gradations in the variation of the brightness levels $Y^*$ of the colors than are used for the U and V chroma values (i.e. hues) of the colors. This is desirable, since the human eye is more sensitive to luminance "contouring" than it is to chroma contouring The problem of contouring arises due to the fact that the original 256 fine gradations in each of the Y, U, and V values are now changed to 32 brightness levels Y (in "steps of 8" of the original gradations) and 8 chroma levels in each of U and Y (in "steps of 32" of the original gradations). It is therefore desirable to dither the luminance (Y) values with dither matrices having lower noise amplitudes than would corresponding dither matrices for the U and V values. For example, dither matrices having only 16 different levels (e.g. 0–15) of the original gradations would be enough to change any $Y^*$ value by an amount of up to two "steps of 8", which is quite adequate to provide excellent contour reduction, while at the same time avoiding undesirable "dithering noise artifacts." The U and the V values would require significantly larger noise amplitudes in the dither matrices in order to be effective. An example of suitable Y dither matrices for 4×4 blocks of pixels are the following:

| 0  | 12 | 3  | 15 | 7  | 3  | 10 | 6  | 15 | 3  | 12 | 0  |
|----|----|----|----|----|----|----|----|----|----|----|----|
| 10 | 6  | 9  | 5  | 1  | 13 | 0  | 12 | 5  | 9  | 6  | 10 |
| 2  | 14 | 1  | 13 | 9  | 5  | 8  | 4  | 13 | 1  | 14 | 2  |
| 8  | 4  | 11 | 7  | 15 | 11 | 2  | 14 | 7  | 11 | 4  | 8  |
|    | "D1" |  |    |    | "D2" |  |    |    | "D3" |  |    |

If these dither matrices are applied sequentially in time to the same pixel locations in consecutive frames, the observer's eyes will serve as a "temporal integrator" to help to smooth out the "grainy" dithering artifacts that otherwise tend to occur. So, for example, these matrices could be used alternately in time as follows:

| D1 | D2 | D3 | D1 | D2 | D3 ... |
|----|----|----|----|----|--------|
| (Frame 1) | (Frame 2) | (Frame 3) | (Frame 4) | (Frame 5) | (Frame 6) ... |

The dithering can be done before or after the above-described color conversion technique is employed. Applicant's laboratory simulations have shown that doing the dithering before the above-described color conversion step gives preferred results (i.e. reduced noticeable artifacts). Computer-implemented techniques for applying a dithering matrix to a block of pixel data are well-known to those skilled in the art. See, for example, "Digital Pictures, Representation and Compression," Plenum Press, 1988, by Netravali & Haskell.

Figure 4:
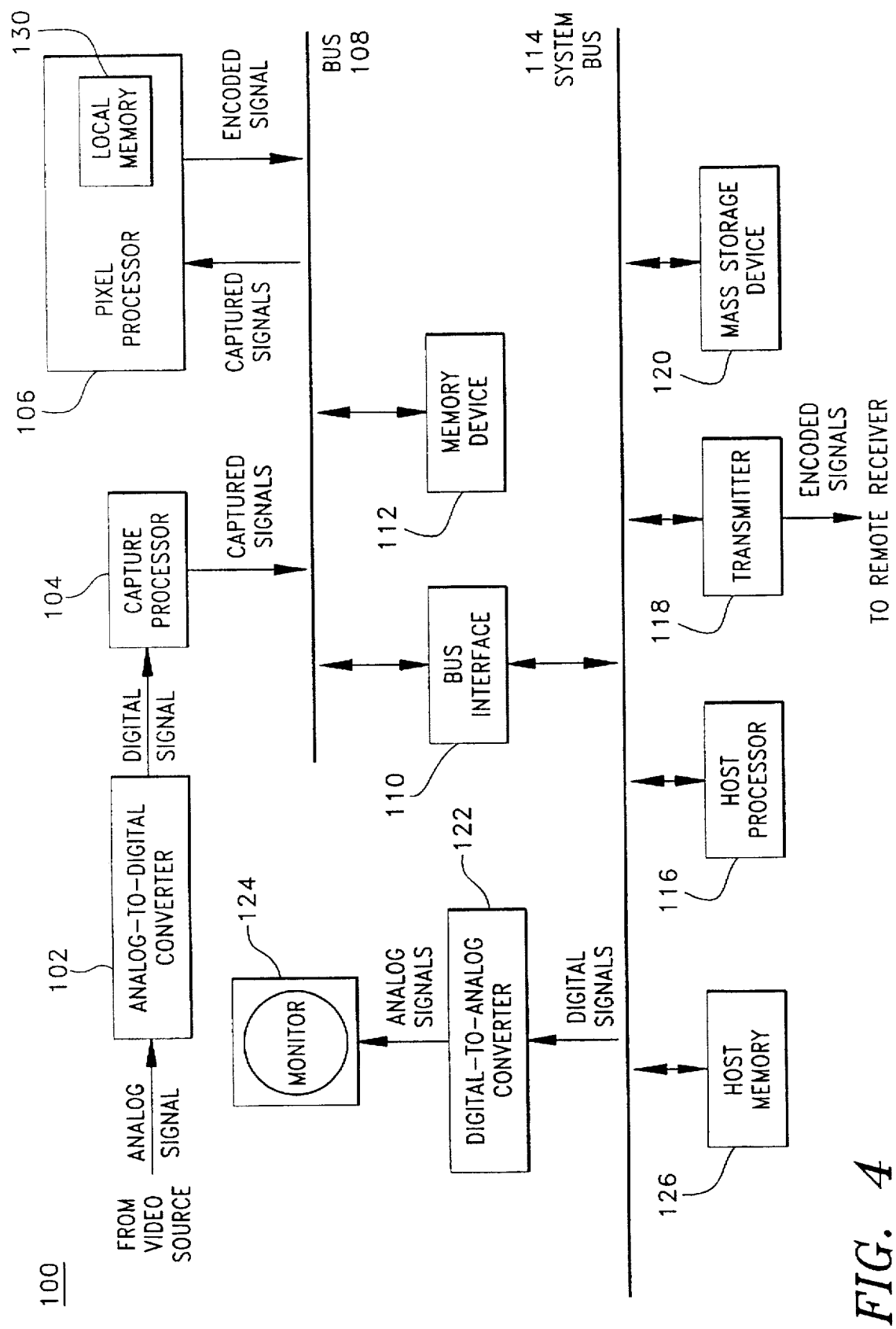
FIG. 4 shows a typical computer-implemented digital video encoding and transmitting system.
Figure 5:
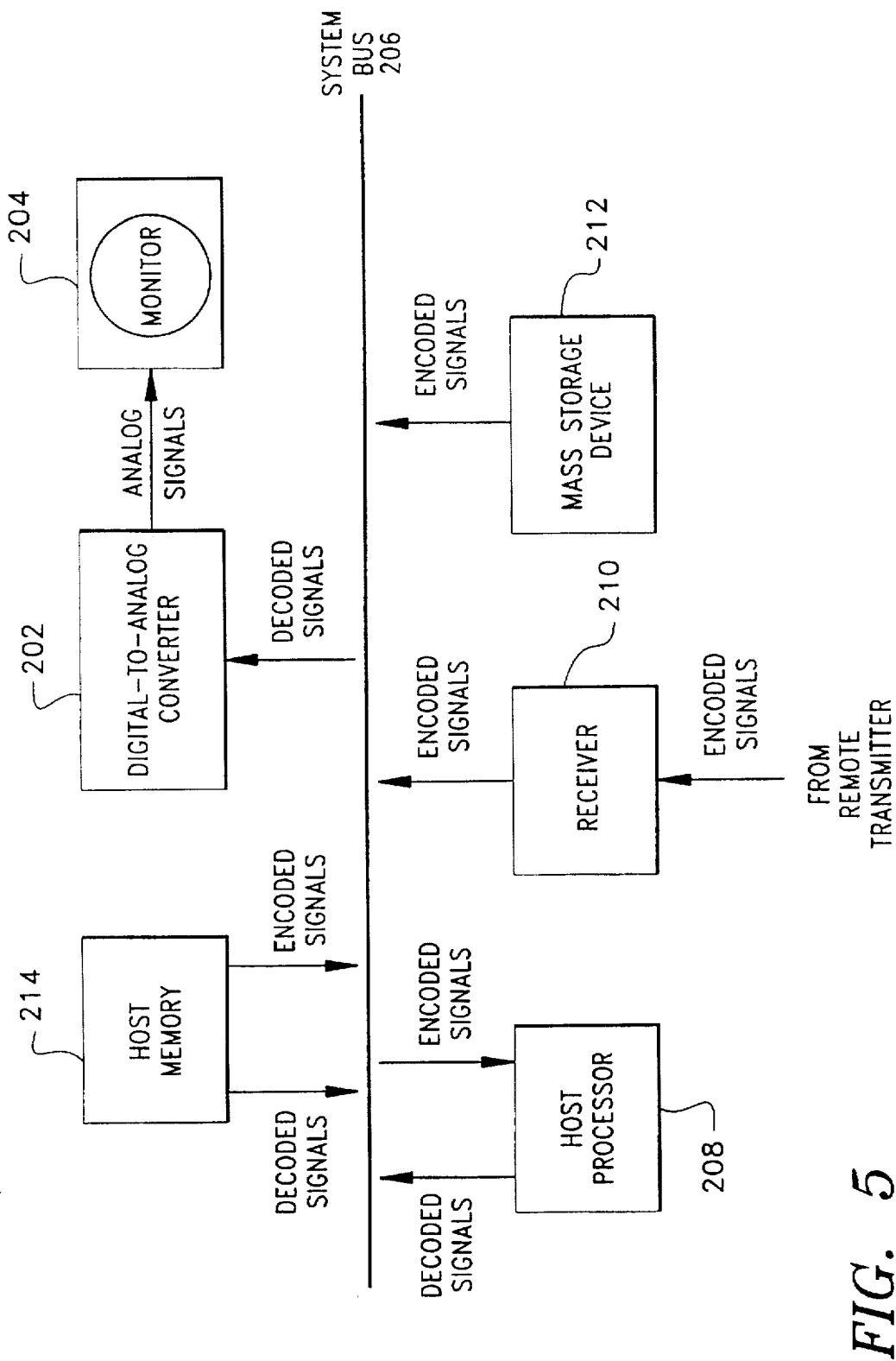
FIG. 5 shows a typical digital video receiving and decoding and display system.

All the above-described techniques can be implemented by well known encoding and decoding computer apparatus as depicted in FIGS. 4 and 5.

Referring now to FIG. 4, there is shown a computer-based encoding system 100 for encoding video image signals, according to a preferred embodiment of the present invention. Analog-to-digital (A/D) converter 102 of encoding system 100 receives analog video image signals from a video source. The video source may be any suitable source of analog video image signals such as a video camera or VCR for generating local analog video image signals or a video cable or antenna for receiving analog video image signals from a remote source. A/D converter 102 decodes (i.e., separates the signal into constituent components) and digitizes each frame of the analog video image signals into digital image component signals (e.g., in a preferred embodiment, Y, U, and V component signals).

Capture processor 104 receives, captures, and stores the digitized component signals as subsampled video images in memory device 112 via bus 108. Each subsampled video image is represented by a set of two-dimensional component planes or pixel bit maps, one for each component of the digitized video image signals. In a preferred embodiment, capture processor 104 captures video image signals in a YUV9 or YUV4:1:1 format, in which every (4×4) block of pixels of the Y component plane corresponds to a single pixel in the U component plane and a single pixel in the V component plane.

Pixel processor 106 accesses captured bitmaps from memory device 112 via bus 108 and generates encoded image signals that represent one or more of the captured video images. Depending upon the particular encoding method implemented, pixel processor 106 applies a sequence of compression techniques to reduce the amount of data used to represent the information in each image. The compression method of motion estimation in accordance with the present invention will be further described below. The encoded image may then be stored to memory device 112 via bus 108 for transmission to host processor 116 via bus 108, bus interface 110, and system bus 114 for storage in host memory 126. Pixel processor 106 also may contain local memory 130, which is a tightly-coupled on-chip memory suitable for locally storing a number of pixels and other data. Those skilled in the art will appreciate that system bus 114 and bus 108 may be merged into the same system bus 114. It will further be understood that host processor 116 may in alternative preferred embodiments perform the functions of pixel processor 106 described herein. Similarly, in alternative preferred embodiments a general memory device such as host memory 126 or memory device 112 may perform the functions of local memory 130 described herein.

Host processor 116 may transmit the encoded image to transmitter 118 for real-time transmission to a remote receiver (not shown in FIG. 4), store the encoded image to mass storage device 120 for future processing, or both. In addition, digital-to-analog converter 122 may receive and convert digital image signals to analog image signals for display in one or more windows on monitor 124. These image signals may correspond, for example, to raw captured video images or companded video images (i.e., the results of compressing and decompressing selected captured video images).

Referring now to FIG. 5, there is shown a computer-based decoding system 200 for decoding the image signals encoded by encoding system 100 of FIG. 4, according to a preferred embodiment of the present invention. Host processor 208 of decoding system 200 receives encoded image signals via system bus 206 that were either stored in mass storage device 212 or received by receiver 210 from a remote transmitter, such as transmitter 118 of FIG. 1. The host processor 208 temporarily stores the encoded image signals in host memory 214.

Host processor 208 decodes the encoded image signals and scales the decoded image signals for display. Decoding the encoded image signals involves undoing the compression processing implemented by pixel processor 106 of encoding system 100 of FIG. 4. Scaling the decoded image signals involves upsampling the U and V component signals to generate full-sampled Y, U, and V component signals in which there is a one-to-one-to-one correspondence between Y, U, and V pixels in the scaled component planes. Scaling may also involve scaling the component signals to a display size and/or resolution different from the image signals as original captured. Host processor 208 then stores the scaled decoded image signals to host memory 214 for eventual transmission to digital-to-analog (D/A) converter 202 via system bus 206. D/A converter converts the digital scaled decoded image signals to analog image signals for display on monitor 204.

Referring again to FIG. 4, encoding system 100 is preferably a general microprocessor-based personal computer (PC) system with a special purpose video-processing plug-in board. In particular, A/D converter 102 may be any suitable means for decoding and digitizing analog video image signals. Capture processor 104 may be any suitable processor for capturing digitized video image component signals as subsampled frames. Pixel processor 106 may be any suitable means for encoding subsampled video image signals, where the means is capable of implementing functions such as a forward discrete cosine transform and a motion estimation and block matching procedures as described in further detail below. Memory device 112 may be any suitable computer memory device and is preferably a dynamic random access memory (DRAM) device. Bus 108 may be any suitable digital signal transfer device and is preferably an Industry Standard Architecture (ISA) bus or Extended ISA (EISA) bus or a Peripheral Component Interface (PCI) bus. Bus interface 110 may be any suitable means for interfacing between bus 108 and system bus 114. In a preferred embodiment, A/D converter 102, capture processor 104, pixel processor 106, bus 108, bus interface 110, and memory device 112 are contained in a single plug-in board, such as an Intel® ActionMedia®-II board, capable of being added to a general microprocessor-based personal computer (PC) system.

Host processor 116 may be any suitable means for controlling the operations of the special-purpose video processing board and is preferably an Intel® general purpose microprocessor such as an Intel® 386, 486or Pentium® processor. Host memory 126 may be any suitable memory device used in conjunction with host processor 116 and is preferably a combination of random access memory (RAM) and read-only memory (ROM). System bus 114 may be any suitable digital signal transfer device and is preferably a PCI bus. Alternatively, system bus 114 may be an Industry Standard Architecture (ISA) bus or Extended ISA (EISA) bus. Mass storage device 120 may be any suitable means for storing digital signals and is preferably a computer hard drive. Transmitter 118 may be any suitable means for transmitting digital signals to a remote receiver and is preferably transmits digital signals over PSTN lines. Those skilled in the art will understand that the encoded video signals may be transmitted using any suitable means of transmission such as telephone line (PSTN or ISDN), RF antenna, local area network, or remote area network.

D/A converter 122 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

Referring now again to FIG. 5, decoding system 200 is preferably a general microprocessor-based personal computer (PC) system similar to the basic PC system of encoding system 100. In particular, host processor 208 may be any suitable means for decoding and scaling encoded image signals and is preferably an Intel® general purpose microprocessor such as an Intel® 386, 486, or Pentium® processor. Host memory 214 may be any suitable memory device used in conjunction with host processor 116 and is preferably a combination of random access memory (RAM) and read-only memory (ROM). In an alternative preferred embodiment, decoding system 200 may also have a pixel processor similar to pixel processor 106 of FIG. 4 for decoding the encoded image signals and a display processor such as an Intel® i750® Display Processor for scaling the decoded image signals.

System bus 206 may be any suitable digital signal transfer device and is preferably an Industry Standard Architecture (ISA) bus or Extended ISA (EISA) bus. Mass storage device 212 may be any suitable means for storing digital signals and is preferably a CD-ROM device. Receiver 210 may be any suitable means for receiving the digital signals transmitted by transmitter 118 of encoding system 100. D/A converter 202 may be any suitable device for converting digital image signals to analog image signals and is preferably implemented through a personal computer (PC)-based display system such as a VGA or SVGA system. Monitor 204 may be any means for displaying analog image signals and is preferably a VGA monitor.

In a preferred embodiment, encoding system 100 of FIG. 4 and decoding system 200 of FIG. 5 are two distinct computer systems. In an alternative preferred embodiment of the present invention, a single computer system comprising all of the different components of systems 100 and 200 may be used to encode and decode video image signals. Those skilled in the art will understand that such a combined system may be used to display decoded video image signals in real-time during the capture and encoding of video signals to monitor the encoding processing.

Although preferred embodiments of the method and apparatus of the invention have been described in detail herein, Applicant's invention is not limited thereto, but rather is defined by the appended claims and their fair equivalents.

What is claimed is:

1. In a digital video color processing system, a method for conversion from a YUV color format to a digital color palette suitable for use with a color video display device, comprising the steps of:

(a) receiving pixel data in the YUV color format;
   (b) multiplying the Y component of said pixel data by a fractional multiplier to produce a scaled-down Y component; and
   (c) forming an index word from the U component, the V component, and the scaled-down Y component.

2. The method of claim 1, wherein said digital color palette is a restricted-size digital color palette.

3. The method of claim 1, further comprising the step of:
   (d) mapping from said index word to said digital color palette.

4. The method of claim 1, wherein:
   the pixel data comprises, for each pixel, p bits for the Y component, p bits for the U component, and p bits for the V component; and
   step (c) comprises the step of forming the index word from the k most significant bits of the U component, the m most significant bits of the V component, and the n most significant bits of the scaled-down Y component, wherein k and m are positive integers that are less than positive integer n, and n is a positive integer less than p.

5. The method of claim 4, wherein p=8, n=5, k=3, and m=3.

6. The method of claim 5, wherein said fractional multiplier is ¾.

7. The method of claim 6, further comprising the step of mapping from said index word to said digital color palette, wherein said digital color palette is a VGA palette.

8. The method of claim 7, wherein said VGA palette comprises 256 colors, 16 of which are reserved and are not mapped from said index word.

9. The method of claim 1, further comprising the following step ($a_0$) to be performed before step (a): receiving sub-sampled pixel data and upsampling same into full-sampled pixel data.

10. The method of claim 9, further comprising the following step ($a_1$) to be performed after step ($a_0$) and before step (a): adding dithering values from one or more dither matrices to said full-sampled pixel data.

11. The method of claim 10, further comprising the step of applying a plurality of different dither matrices in a temporal sequence to equally-situated blocks of pixel data in sequential frames of digital video data.

12. In a digital video color processing system, an apparatus for conversion from a YUV color format to a digital color palette suitable for use with a color video display device, the apparatus comprising:

(a) means for receiving pixel data in the YUV color format;
   (b) means for multiplying the Y component of said pixel data by a fractional multiplier to produce a scaled-down Y component; and
   (c) means for forming an index word from the U component, the V component, and the scaled-down Y component.

13. The apparatus of claim 12, wherein said digital color palette is a restricted-size digital color palette.

14. The apparatus of claim 12, further comprising:

(d) means for mapping from said index word to said digital color palette.

15. The apparatus of claim 12, wherein:
   the pixel data comprises, for each pixel, p bits for the Y component, p bits for the U component, and p bits for the V component; and
   means (c) comprises means for forming the index word from the k most significant bits of the U component, the m most significant bits of the V component, and the n most significant bits of the scaled-down Y component, wherein k and m are positive integers that are less than positive integer n, and n is a positive integer less than p.

16. The apparatus of claim 15, wherein p=8, n=5, k=3, and m=3.

17. The apparatus of claim 16, wherein said fractional multiplier is ¾.

18. The apparatus of claim 17, further comprising means for mapping from said index word to said digital color palette, wherein said digital color palette is a VGA palette.

19. The apparatus of claim 18, wherein said VGA palette comprises 256 colors, 16 of which are reserved and are not mapped from said index word.

20. The apparatus of claim 12, further comprising means for receiving sub-sampled pixel data and upsampling same into full-sampled pixel data.

21. The apparatus of claim 20, further comprising means for adding dithering values from one or more dither matrices to said full-sampled pixel data.

22. The apparatus of claim 11, further comprising means for applying a plurality of different dither matrices in a temporal sequence to equally-situated blocks of pixel data in sequential frames of digital video data.

23. A computer-readable medium having stored thereon a plurality of instructions which, when executed by a processor, cause the processor to perform the steps of:

(a) receiving pixel data in a YUV color format;
   (b) multiplying the Y component of said pixel data by a fractional multiplier to produce a scaled-down Y component; and
   (c) forming an index word from the U component, the V component, and the scaled-down Y component.

24. The computer-readable medium of claim 23, wherein the index word is compatible with a digital color palette, wherein said digital color palette is a restricted-size digital color palette.

25. The computer-readable medium of claim 23, wherein the plurality of instructions further causes the processor to perform the step of:

(d) mapping from said index word to a digital color palette.

26. The computer-readable medium of claim 23, wherein:
   the pixel data comprises, for each pixel, p bits for the Y component, p bits for the U component, and p bits for the V component; and
   step (c) comprises the step of forming the index word from the k most significant bits of the U component, the m most significant bits of the V component, and the n most significant bits of the scaled-down Y component, wherein k and m are positive integers that are less than positive integer n, and n is a positive integer less than p.

27. The computer-readable medium of claim 26, wherein p=8, n=5, k=3, and m=3.

28. The computer-readable medium of claim 27, wherein said fractional multiplier is ¾.

29. The computer-readable medium of claim 28, wherein the plurality of instructions further causes the processor to perform the step of mapping from said index word to a digital color palette, wherein said digital color palette is a VGA palette.

30. The computer-readable medium of claim 29, wherein said VGA palette comprises 256 colors, 16 of which are reserved and are not mapped from said index word.

31. The computer-readable medium of claim 23, wherein the plurality of instructions further causes the processor to perform the following step ($a_0$) to be performed before step (a): receiving sub-sampled pixel data and upsampling same into full-sampled pixel data.

32. The computer-readable medium of claim 31, wherein the plurality of instructions further causes the processor to perform the following step ($a_1$) to be performed after step ($a_0$) and before step (a): adding dithering values from one or more dither matrices to said full-sampled pixel data.

33. The computer-readable medium of claim 32, wherein the plurality of instructions further causes the processor to perform the step of applying a plurality of different dither matrices in a temporal sequence to equally-situated blocks of pixel data in sequential frames of digital video data.

34. A digital video color processing system, comprising:
a processor; and
a memory coupled to the processor, wherein the memory stores a conversion routine for conversion from a YUV color format to a digital color palette suitable for use with a color video display device, wherein:

(a) the pixel data is received in the YUV color format;

(b) the Y component of said pixel data is multiplied by a fractional multiplier to produce a scaled-down Y component; and (c) an index word is formed from the U component, the V component, and the scaled-down Y component.

35. The digital video color processing system of claim 34, wherein said digital color palette is a restricted-size digital color palette.

36. The digital video color processing system of claim 34, wherein:

(d) said index word is mapped to said digital color palette.

37. The digital video color processing system of claim 34, wherein:

the pixel data comprises, for each pixel, p bits for the Y component, p bits for the U component, and p bits for the V component; and the index word is formed from the k most significant bits of the U component, the m most significant bits of the V component, and the n most significant bits of the scaled-down Y component, wherein k and m are positive integers that are less than positive integer n, and n is a positive integer less than p.

38. The digital video color processing system of claim 37, wherein p=8, n=5, k=3, and m=3.

39. The digital video color processing system of claim 38, wherein said fractional multiplier is ¾.

40. The digital video color processing system of claim 39, wherein said index word is mapped to said digital color palette, wherein said digital color palette is a VGA palette.

41. The digital video color processing system of claim 40, wherein said VGA palette comprises 256 colors, 16 of which are reserved and are not mapped from said index word.

42. The digital video color processing system of claim 34, wherein the plurality of instructions further causes the processor to perform the following step ($a_0$) to be performed before step (a): receiving sub-sampled pixel data and upsampling same into full-sampled pixel data.

43. The digital video color processing system of claim 42, wherein the plurality of instructions further causes the processor to perform the following step ($a_1$) to be performed after step ($a_0$) and before step (a): adding dithering values from one or more dither matrices to said full-sampled pixel data.

44. The digital video color processing system of claim 43, wherein the plurality of instructions further causes the processor to perform the step of applying a plurality of different dither matrices in a temporal sequence to equally-situated blocks of pixel data in sequential frames of digital video data.

* * * * *